(12) United States Patent
Wolfus et al.

(10) Patent No.: US 11,562,841 B2
(45) Date of Patent: Jan. 24, 2023

(54) HYBRID SUPERCONDUCTING MAGNETIC DEVICE

(71) Applicant: MIO SMES LTD., Moshav Nahalal (IL)

(72) Inventors: Shuki Wolfus, Rosh Haayin (IL); Alexander Friedman, Rosh Haayin (IL); Yakov Nikulshin, Kiryat Ono (IL); Eliezer Perel, Tel Aviv (IL); Yosef Yeshurun, Ganei Tikva (IL)

(73) Assignee: MIO SMES LTD., Moshav Nahalal (IL)

( * ) Notice: Subject to any disclaimer, the term of this patent is extended or adjusted under 35 U.S.C. 154(b) by 138 days.

(21) Appl. No.: 17/083,941

(22) Filed: Oct. 29, 2020

(65) Prior Publication Data

US 2021/0074458 A1    Mar. 11, 2021

Related U.S. Application Data

(62) Division of application No. 15/753,332, filed as application No. PCT/IL2016/050911 on Aug. 18, 2016, now Pat. No. 10,867,731.

(Continued)

(51) Int. Cl.
*H01H 67/02* (2006.01)
*H01F 6/06* (2006.01)
(Continued)

(52) U.S. Cl.
CPC .............. *H01F 6/06* (2013.01); *B03C 1/0337* (2013.01); *B03C 1/288* (2013.01); *H01F 6/00* (2013.01);
(Continued)

(58) Field of Classification Search
CPC .......... H01F 6/006; H01F 6/06; H01F 41/048; H01F 6/00; H01F 2006/001; B03C 1/288; B03C 1/033; B03C 1/0337; B03C 2201/18
(Continued)

(56) References Cited

U.S. PATENT DOCUMENTS 4,568,900 A * 2/1986 Agatsuma ................. H01F 6/06
                                                 336/DIG. 1
6,072,307 A    6/2000 Yeshurun et al.
(Continued)

FOREIGN PATENT DOCUMENTS

JP     H0534643 U    7/1991
JP     H099499 A     1/1997
(Continued)

OTHER PUBLICATIONS

Superconducting magnetic energy storage device operating at liquid nitrogen temperatures A. Friedman, N. Shaked, E. Perel, M. Sinvani, Y. Wolfus, & Y. Yeshurun. Institute for Superconductivity, Department of Physics, Bar-Ilan University, Ramat-Gan 52900, Israel. Retrieved Nov. 15, 2021 from: https://superconductivity.biu.ac.il/files/superconductivity/shared/katz_1999_1-s2.0-s001122759800126x-main.pdf.

(Continued)

*Primary Examiner* — Shawki S Ismail
*Assistant Examiner* — Lisa N Homza
(74) *Attorney, Agent, or Firm* — The Roy Gross Law Firm, LLC; Roy Gross

(57) ABSTRACT

A hybrid superconductive device for stabilizing an electric grid comprises (a) a magnetic core arrangement at least partially carrying an AC winding the AC winding connectable to an AC circuit for a current to be limited in the event of a fault; (b) at least one superconductive coil configured (Continued)

for storing electromagnetic energy; the superconductive coil magnetically coupled with the core arrangement and saturating the magnetic core arrangement during use. The hybrid superconductive device further comprises a switch unit preprogrammed for switching electric current patterns corresponding to the following modes: at least partially charging the superconductive coil; a standby mode when the superconductive coil is looped back; and at least partially discharging the superconductive coil into the circuit.

Optionally, hybrid superconductive device comprises at least one passage located within said magnetic flux. The passage conducts a material flow comprising components magnetically separable by said magnetic flux.

6 Claims, 11 Drawing Sheets

Related U.S. Application Data

(60) Provisional application No. 62/206,871, filed on Aug. 19, 2015.

(51) Int. Cl.
*B03C 1/033* (2006.01)
*B03C 1/28* (2006.01)
*H01F 6/00* (2006.01)
*H01F 41/04* (2006.01)

(52) U.S. Cl.
CPC ........... *H01F 6/006* (2013.01); *H01F 41/048* (2013.01); *B03C 2201/18* (2013.01); *H01F 2006/001* (2013.01)

(58) Field of Classification Search
USPC ........................................................ 335/216
See application file for complete search history.

(56) References Cited

U.S. PATENT DOCUMENTS

| | | | | |
|---|---|---|---|---|
| 6,489,701 B1* | 12/2002 | Gamble | .................. | H02K 3/47 310/55 |
| 6,580,346 B1* | 6/2003 | Takeshima | ......... | G01R 33/3875 324/319 |
| 6,822,363 B2* | 11/2004 | Leijon | ................... | H02K 15/12 174/DIG. 26 |
| 7,742,264 B2 | 6/2010 | Hyun et al. | | |
| 8,351,167 B2 | 1/2013 | Wolfus et al. | | |
| 2002/0018327 A1* | 2/2002 | Walker | ..................... | H01F 6/06 361/19 |
| 2003/0034701 A1* | 2/2003 | Weeber | .................... | H02K 9/18 310/52 |
| 2004/0212364 A1* | 10/2004 | Morita | ............. | G01R 33/34007 324/318 |
| 2006/0044105 A1* | 3/2006 | Darmann | ................. | H01F 6/00 361/19 |
| 2006/0158803 A1* | 7/2006 | Friedman | ................ | H02H 9/021 361/58 |
| 2009/0021875 A1* | 1/2009 | Wolfus | .................... | H01F 29/14 361/58 |
| 2009/0315655 A1* | 12/2009 | Damiani | ............ | G01R 33/3806 335/216 |
| 2010/0296217 A1* | 11/2010 | Darmann | .................. | H01F 6/06 361/93.5 |
| 2010/0311596 A1 | 12/2010 | Xin et al. | | |
| 2011/0034337 A1 | 2/2011 | Dommerque et al. | | |
| 2011/0147295 A1* | 6/2011 | Penas Ballester | ..... | B01D 61/00 210/223 |
| 2012/0153927 A1* | 6/2012 | Wolfus | ...................... | H01F 3/10 323/310 |
| 2012/0154966 A1* | 6/2012 | Wolfus | .................... | H01F 29/14 361/58 |
| 2014/0192450 A1* | 7/2014 | Hall | .......................... | H01F 3/10 361/93.6 |
| 2014/0296074 A1* | 10/2014 | Kajikawa | ........... | G01R 33/3815 505/162 |
| 2016/0013634 A1* | 1/2016 | Hall | ......................... | H02H 9/02 361/93.9 |
| 2016/0064128 A1* | 3/2016 | Kummeth | ................. | H01F 6/06 505/211 |
| 2018/0308611 A1* | 10/2018 | Wolfus | ..................... | H01F 6/00 |

FOREIGN PATENT DOCUMENTS

| | | |
|---|---|---|
| JP | H08250322 A | 1/1997 |
| JP | 2006504254 A | 2/2006 |
| JP | 2011510603 A | 3/2011 |
| WO | 2006001170 A1 | 1/2006 |
| WO | 2007029224 A1 | 3/2007 |
| WO | 2009006666 | 1/2009 |

OTHER PUBLICATIONS

PCT International Search Report for International Application No. PCT/IL2016/050911, dated Nov. 29, 2016, 5pp.

PCT Written Opinion for International Application No. PCT/IL2016/050911, completed Nov. 28, 2016, 6pp.

Supplementary European Search Report for European Application No. EP16836760, completed Apr. 10, 2019, 1pg.

Kopylov, S.I. et al. "Joint operation of the superconducting fault current limiter and magnetic energy storage system in an electric power network", Journal of Physics: Conference Series 234 (2010) 032029; Retrieved Nov. 15, 2021; doi: 10.1088/1742-6596/234/3/032029.

Kopylov, S.I. et al. "Use of Superconducting Devices Operating Together to Ensure the Dynamic 10 Stability of Electric Power System", IEEE Trans. On Appl. Supercon. 21, (2011). Retrieved Nov. 15, 2021; doi: 10.1109/TASC.2010.2100092.

Caihong Zhao et al. "Development and Test of a Superconducting Fault Current Limiter-Magnetic Energy Storage (SFCL-MES) System", IEEE Trans. On Appl. Supercond. 17, (2007) 2014. Retrieved Nov. 15, 2021; doi: 10.1109/TASC.2007.899825.

\* cited by examiner

HYBRID SUPERCONDUCTING MAGNETIC DEVICE

CROSS REFERENCE TO RELATED APPLICATIONS

This application is a divisional application of U.S. patent application Ser. No. 15/753,332 filed on Feb. 19, 2018, which is a National Phase of PCT Patent Application No. PCT/1112016/050911 filed on Aug. 18, 2016 and published as WO 2017/029676 on Feb. 23, 2017, which claims the benefit of priority from U.S. Provisional Application No. 62/206,871 filed on Aug. 19, 2015.

FIELD OF THE INVENTION

The present invention relates to superconductive magnetic devices and more specifically to a superconductive hybrid device concurrently providing functions of a fault current limiter, a magnetic energy storing device and a magnetic separation device.

BACKGROUND OF THE INVENTION

The continuous growth worldwide in demand and generation of electric power goes side by side with the need for better, more reliable and more stable electric grids. Grid connectivity is used wherever possible for ensuring supply and for transmitting energy over large distances, enabling use of renewable energy (solar, wind, hydro, etc.) at locations far from its generation location. The last two decades have witnessed worldwide R&D efforts of high current/voltage devices based on high-temperature superconductors. The improvement in the quality of the wires and the advent of superconducting wires of the second generation have allowed successful demonstration of technological feasibility of devices such as superconducting transformers and generators, superconducting magnetic energy storage (SMES), high gradient magnetic separators (HGMS) and fault current limiters (FCL). The latter is the first to be commercialized; several FCLs are already installed, and operate successfully, in utilities in Europe and the USA.

In parallel to this technological development, an impressive progress has been made in the field of green energy and smart grids. As the need for saving and preserving energy is becoming a worldwide interest, efforts are made in developing more efficient and reliable networks. The new high current/voltage superconductors-based devices merge naturally into this trend of highly sophisticated, green devices, as they make use of the low energy-loss character of superconductors to improve the efficiency and reliability of the electricity networks.

Recent scientific works have addressed the issue of having both SMES and FCL operating in a grid. Koplilov et. al. [Kopylov, S. I. et al. "Joint operation of the superconducting fault current limiter and magnetic energy storage system in an electric power network", *Journal of Physics: Conference Series* 234 (2010) 032029; Kopylov, S. I. et al. "Use of Superconducting Devices Operating Together to Ensure the Dynamic Stability of Electric Power System", *IEEE TRANS. ON APPL. SUPERCON.* 21, (2011) 2135)] have pointed to the benefits of such arrangement that will improve the dynamic stability of the grid. Zhao [Caihong Zhao et al. "Development and Test of a Superconducting Fault Current Limiter-Magnetic Energy Storage (SFCL-MES) System", *IEEE TRANS. ON APPL. SUPERCOND.* 17, (2007) 2014.] demonstrated a SMES device which shares a superconducting coil used as a bridge-type fault current limiter. This design makes use of seven transformers; six are used for the SMES and FCL ports and one for current regulation. A rectifying circuit is used to allow the grid current flow through the superconducting coil during fault. Although the authors have demonstrated the feasibility of the bridge-type SFCL-MES solution, this solution is costly and presents a challenge in up scaling the device to high-V networks.

SUMMARY OF THE INVENTION

It is hence one object of the invention to disclose a hybrid superconductive device for stabilizing an electric grid. The aforesaid device comprises: (b) a magnetic core arrangement at least partially carrying an AC winding the AC winding connectable to an AC circuit for a current to be limited in the event of a fault; (c) at least one superconductive coil configured for storing electromagnetic energy; the superconductive coil magnetically coupled with the core arrangement and saturating the magnetic core arrangement during use.

The core purpose of the present invention is to provide the hybrid superconductive device further comprising a switch unit preprogrammed for switching electric current patterns corresponding to the following modes: at least partially charging the superconductive coil; a standby mode when the superconductive coil is looped back; and at least partially discharging the superconductive coil into the circuit.

Another object of the invention is to disclose switch unit comprises a pulse-width-modulation module for charging and discharging the superconductive coil.

A further object of the invention is to disclose the device comprising at least one passage located within the magnetic flux. The passage is configured for conducting a material flow comprising components magnetically separable by the magnetic flux.

A further object of the invention is to disclose the device comprising a charging unit configured for charging said superconductive coil.

A further object of the invention is to disclose the magnetic core arrangement comprising at least one winding magnetic core limb carrying the at least one winding. At least one winding magnetic core limb is mounted such that the least one superconductive coil, when energized, magnetically saturates the at least one core limb magnetic limb.

A further object of the invention is to disclose at least one winding magnetic core limb is shaped in an open configuration.

A further object of the invention is to disclose the superconductive coil carried by at least one coil magnetic core.

A further object of the invention is to disclose the superconductive coil carried by at least one coil magnetic core which is shell-shaped.

A further object of the invention is to disclose at least one shell-shaped coil magnetic core provided with an internal magnetic core limb carrying the superconductive coil.

A further object of the invention is to disclose the internal magnetic limb has an air gap in a central location thereof.

A further object of the invention is to disclose at least one winding magnetic core limb is magnetically connected to the shell-shaped coil magnetic core via an air gap.

A further object of the invention is to disclose at least one coil magnetic core comprises two magnetic core members mounted at the ends of the superconductive coil.

A further object of the invention is to disclose the device comprising an overvoltage protection unit configured for monitoring voltage and temperature distribution across the superconducting coil and preventing thermal runaway in the coil from damage thereof.

A further object of the invention is to disclose a method of stabilizing an electric grid comprising the steps of: (a) providing a hybrid superconductive device comprising: (i) a magnetic core arrangement at least partially carrying an AC winding; the AC winding connectable to an AC circuit for a current to be limited in the event of a fault (ii) at least one superconductive coil configured for storing electromagnetic energy; the superconductive coil magnetically coupled with the core arrangement and saturating the magnetic core arrangement during use; (iv) the hybrid superconductive device further comprises a switch unit preprogrammed for switching electric current patterns corresponding to the following modes: at least partially charging the superconductive coil; a standby mode when the superconductive coil is looped back; and at least partially discharging the superconductive coil into the circuit; (b) charging the superconductive coil; (c) standing in the standby mode; (d) in case of incepting a fault conditions, increasing impedance within the AC winding; (e) discharging the superconductive coil into the AC circuit; (f) cycling steps b to e as needed.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a hybrid superconductive device for stabilizing an electric grid and a method of doing the same.

According to the present invention a single superconducting coil is used as means for storing energy in a SMES device, as a magnetic field source for the MS and as a bias field source for a saturated-core FCL. Special magnetic design integrates the SMES, FCL and MS around a shared superconducting coil. A switching unit samples the grid for variations in power quality and directs energy from/to the grid to/from the superconducting coil while monitoring a possible fault and maintaining required field levels for all applications.

Figure 1A:
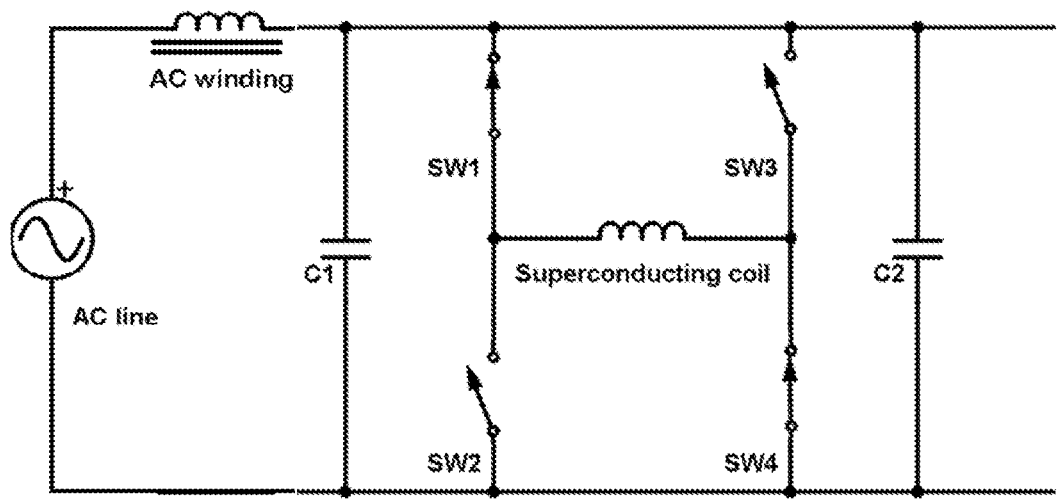
FIGS. 1A to 1D are electric schemes of a hybrid superconductive magnetic device corresponding to different operation modes.
Figure 1B:
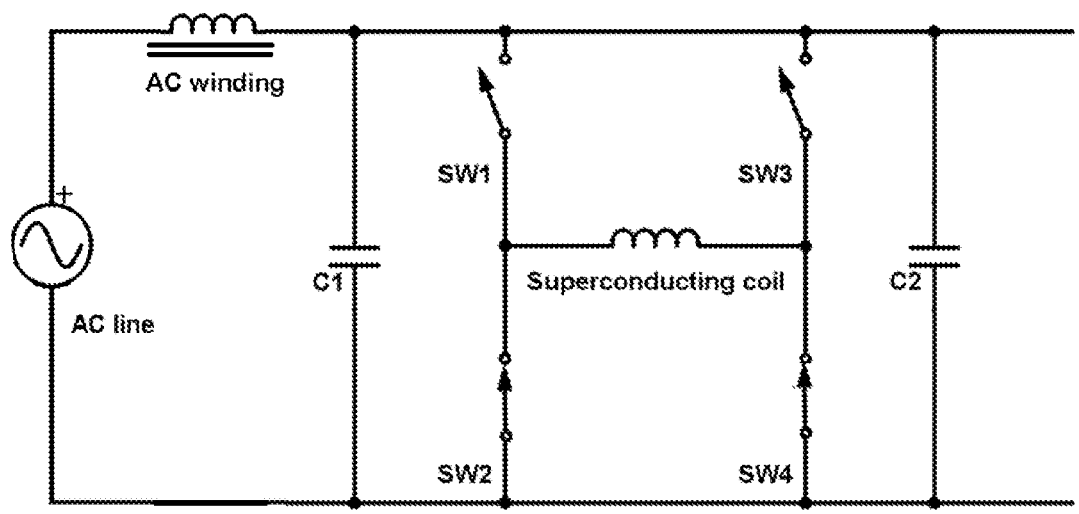
Figure 1C:
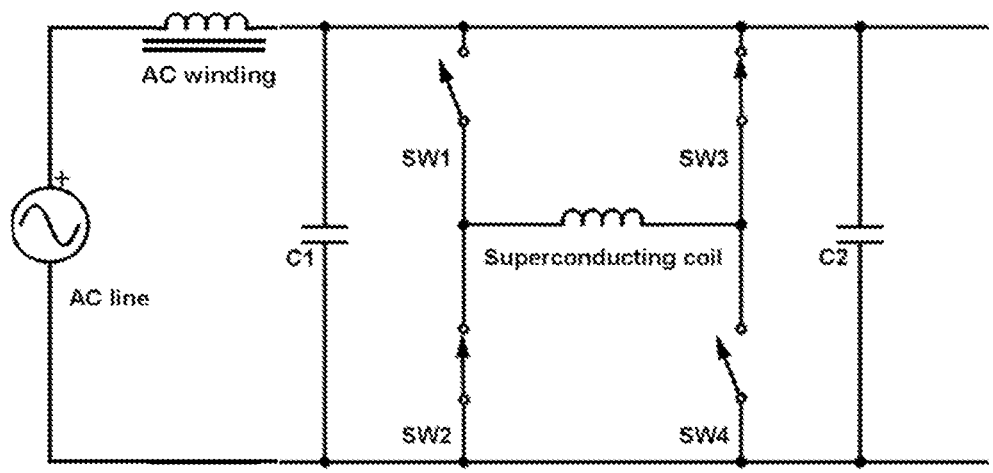

Reference is now made to FIGS. 1A to 1C presenting electric schemes corresponding to different operation modes of the present invention. The electric current patterns implemented by these electric schemes are defined by positions of switches controlled by a switching unit (not shown). Switches SW1 to SW4 are controlled by a switching unit (not shown) base on pulse-width-modulation technology and provide both AC/DC and DC/AC conversion in charging/discharging modes.

Figure 1D:
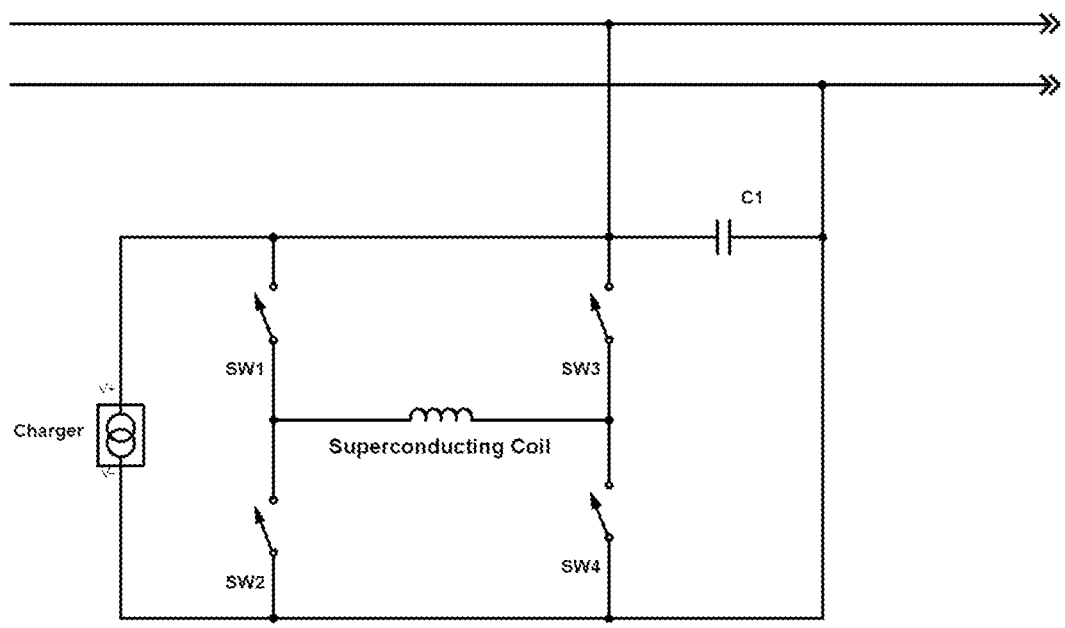

Specifically, FIG. 1A shows switch positions corresponding to a charging mode. Switches SW1 and SW4 are closed, and switches SW2 and SW3 are open. The electric current created within the superconducting coil persists after looping the current back as shown in FIG. 1B. In this electric current pattern, switches SW2 and SW4 are closed and switches SW1 and SW3 open. In the event of missing energy in the AC circuit, the superconductive coil is discharged into the AC circuit. As seen in FIG. 1C, switches SW2 and SW3 are closed and switches SW1 and SW4 open. It should be noted that the device of the present invention not only limits the current in the fault condition but also smooths power variations during the nominal conditions. Functions of capacitors C1 and C2 are also in smoothing output voltage. FIG. 1D presents an electric scheme illustrating an embodiment of the present invention where the superconductive coil is charged by a charger. Electric current patterns defined by switches SW1 to SW4 are similar to depicted in FIGS. 1A to 1C.

While in this scheme the FCL is inserted in series with the same electric circuit the SMES resides in, in general, the SMES and FCL may reside in different circuits. For example, the SMES may be fed and improve power quality on one bus bar while the FCL, which is magnetically coupled to the SMES, resides on another bus bar and provides fault protection therein. Similarly, the SMES and FCL may be magnetically coupled but reside on different networks.

Figure 2A:
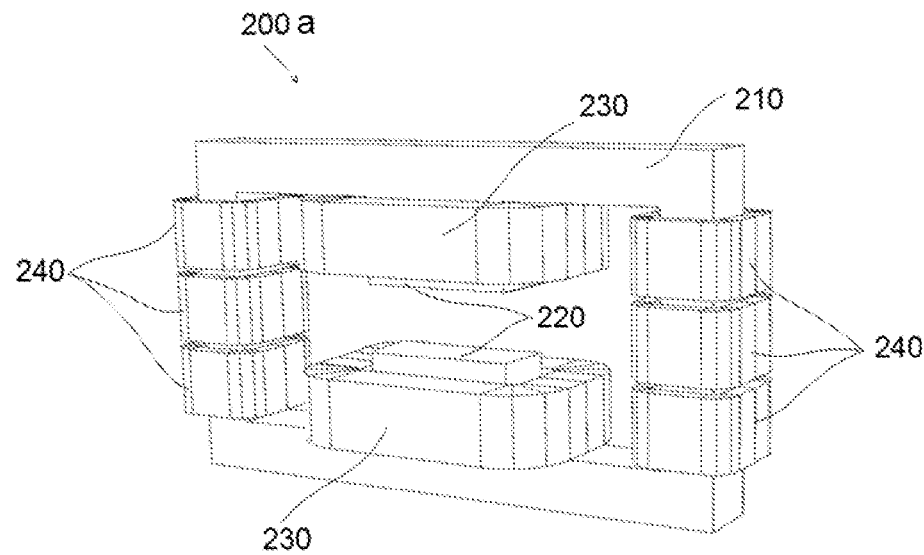
FIGS. 2A and 2B are perspective views of alternative embodiments of a hybrid superconductive magnetic device with a shell-shaped magnetic core arrangement.
Figure 2B:
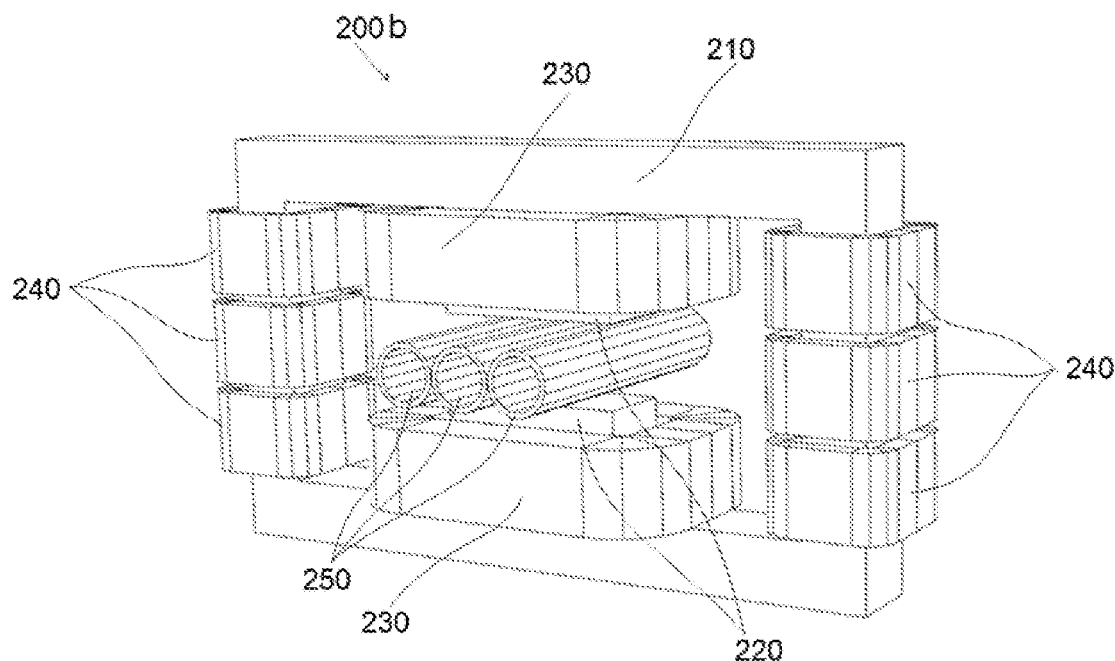

Reference is now made to FIGS. 2A and 2B presenting exemplary embodiments 200a and 200b of a hybrid superconductive magnetic device designed for a single-phase hybrid device. Specifically, embodiment 200a combines FCL and SMES functions while embodiment 200b has an additional function of an HGMS device. Embodiments 200a and 200b have magnetic core arrangement 210 which is shell-shaped. Protruding inwards magnetic core limbs 220 carry superconductive coils 230. AC windings 240 are magnetically coupled with magnetic core arrangement 210. It should be noted that each single-phase winding comprises two winding sections corresponding to two half-cycles of AC current to be limited. Superconductive coil 230 is made in a split configuration mounted on the magnetic core. The split coil configuration enables the insertion of pipes/tubes used for the magnetic separation. Pipes 250, conducting a material to be magnetically separated, discriminate embodiments 200*a* and 200*b* from each other.

The split coil configuration increases the energy stored in the device by storing electromagnetic energy in its gap. This split-core design with electromagnetic energy stored in the coil gap opens the possibility to use relatively small-scale hybrid devices with non-superconducting coils.

Figure 3A:
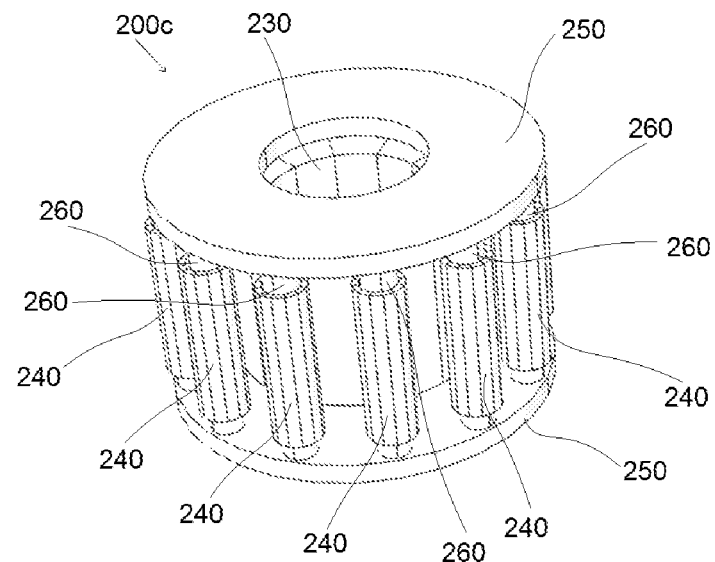
FIGS. 3A and 3B are perspective views of alternative embodiments of a hybrid superconductive magnetic device with a plate-shaped magnetic core arrangement.
Figure 3B:
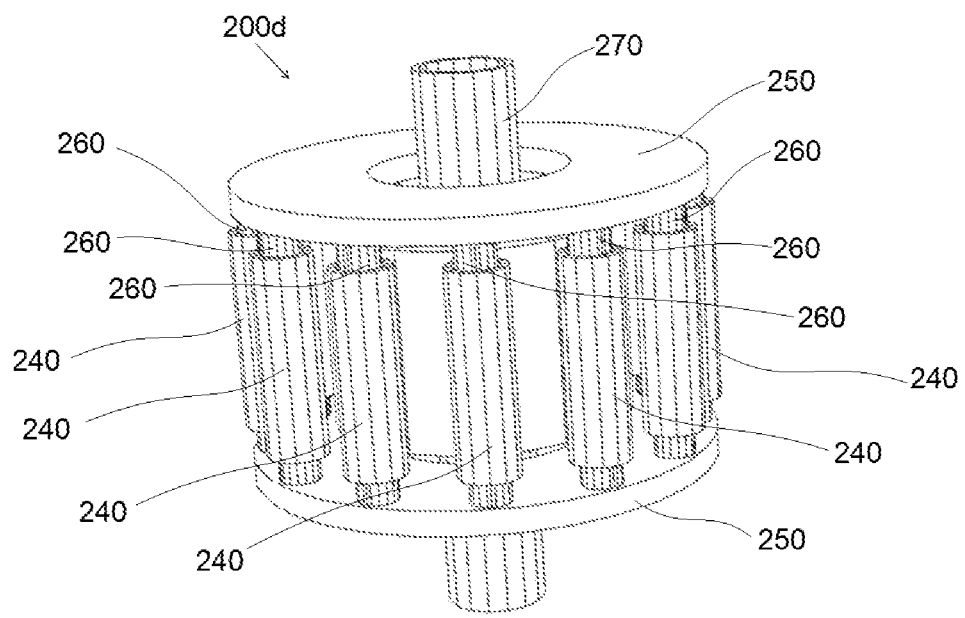

Reference is now made to FIGS. 3A and 3B presenting round embodiments 200*c* and 200*d*. In both embodiments, superconductive coil 230 is wound in a solenoid form whereas its central axial volume may now serve for the magnetic separation of a material conducted by pipe 270 (FIG. 3B). Superconductive coil 230 is between two round magnetic core members 250 mounted at the ends of coil 230. Core members 250 are interconnected by core limbs 260 distributed along a circumference of core members 250. Core members 250 carry AC windings 240. The direction of the current flowing in corresponding AC coils 240 determine the direction of the AC flux therein and the half cycle of the AC current at which its flux opposed the DC bias flux thus the impedance. Cores 260 are saturated by the DC flux of the superconducting coil 230. Core members 250 are added to drive the DC flux into the core limbs 260 while a gap between core members 250 and coil 230 is left for tuning a flux value directed into core limbs 260. The described arrangement is usable as a hybrid device concurrently having single or three-phase or multi-phase FCL, SMES and MS functionalities. In addition, core members 250 trap the DC returning flux and reduce the residual field outside the device. Any shape of core members 250 such as round, regular or irregular polygon are in the scope of the present invention. Exemplary embodiments 200*c*/200*d* comprise 12 core limbs mounted along superconductive coil 230 would support two three-phase FCLs. FIG. 3B shows embodiment 200*d*, which, in addition to the abovementioned components, comprises pipe 270 configured for conducting a material to be magnetically separated.

Figure 4A:
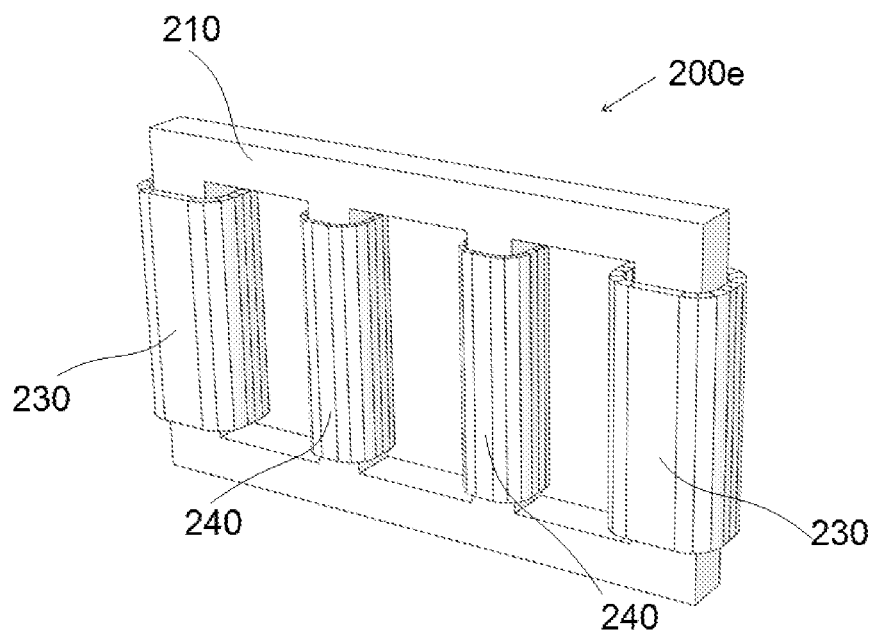
FIGS. 4A and 4B are a perspective view of an alternative embodiment of a hybrid superconductive magnetic device with a shell-shaped magnetic core arrangement and a cross-sectional view thereof.
Figure 4B:
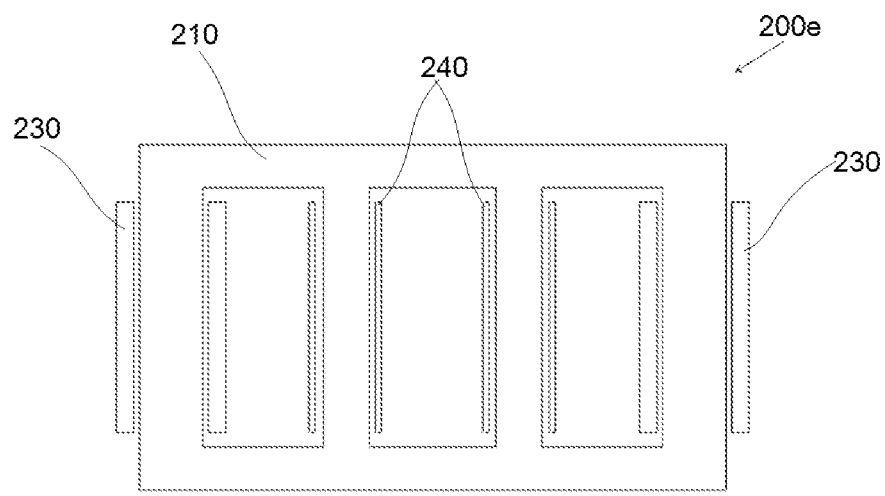

Reference is now made to FIGS. 4A and 4B presenting a perspective view of SMES-FCL alternative embodiment 200*e* of a hybrid superconductive magnetic device with a shell-shaped magnetic core arrangement and its cross-sectional view, respectively. FIG. 4A describes a three-dimensional example of another SMES-FCL embodiment. A 4-limb structure is described for handling one phase. Outer superconductive coils 230 function as SMES coils which saturate the magnetic core arrangement 210. Numeral 240 refers to AC windings carried by magnetic core arrangement 210 as well. Coils 230 are charged in the same direction (up or down in the figure) to generate DC magnetic field in the same direction in the inner limbs. Windings 240 are wound in opposite directions on the inner limbs so that in each half-cycle of the AC current, one coil supports the direction of the DC flux in the limb while the other coil opposes it. The outer DC limbs may be of larger cross-section than the inner AC limbs to support flux density enhancement in the AC limbs. Not shown in FIGS. 4A and 4B but gaps may be added between the outer DC and inner AC limbs to control the saturation level in the inner AC limbs and allow desaturation of the inner AC limbs in the event of fault. Multiplication of the single-phase structure shown in FIGS. 4A and 4B provides a multi-phase device. SMES coils 230 may be unified over the phases so that these are wound to include DC limbs of several phases.

Figure 5A:
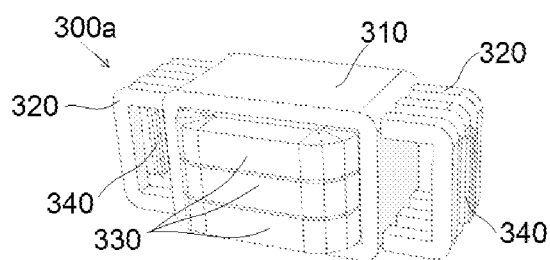
FIGS. 5A to 5E are perspective views of alternative embodiments of a hybrid superconductive magnetic device with a shell-shaped magnetic core arrangement.

Reference is now made to FIGS. 5A to 5E, presenting different embodiments of the present invention. FIG. 5A depicts embodiment 300*a* characterized by a free volume of a SMES gap which is used also for mounting a SMES coil which embodied by coil segments 330 connected in any combination of series and parallel connections to control total coil inductance and operating current and voltage. In a non-limiting manner, the SMES coil comprises three segments 330. The coil comprising at least one segment and made of various conductors or superconductors is also in the scope of the present invention. This exemplary embodiment comprises one AC winding 340 sitting on AC core limb 320. The AC and DC cores 310 and 320, respectively, are separated by a controllable gap width (not shown).

Figure 5B:
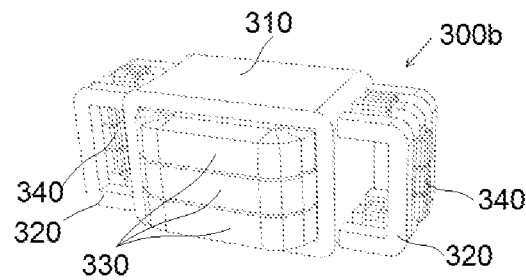

FIG. 5B presents embodiment 300*b* which, contrary to embodiment 300*a*, has with the AC winding split to several winding segments 340. The split lowers the impedance of the AC circuit when the AC limb 320 is saturated and increases its impedance when the core is de-saturated and AC coil segments become coupled.

Figure 5C:
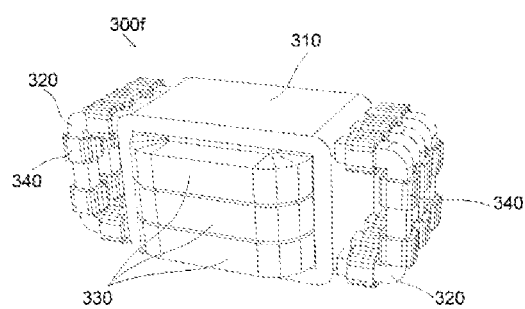

FIG. 5C exhibits embodiment 300*f* similar to 300*a* and 300*b*. In this case, 3-phase FCL device is implemented. Each AC limb 320 carries at least single AC winding segment 340. All AC winding segments 340 on an AC limb 320 are connected in series.

Figure 5D:
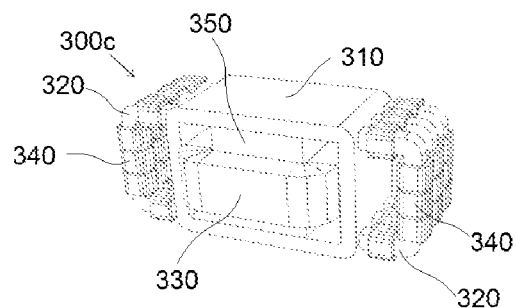

FIG. 5D presents embodiment 300*c* having single-segment superconductive coil 330 while each AC winding sitting on AC core limb 320 is split to 5 winding segments 340.

Figure 5E:
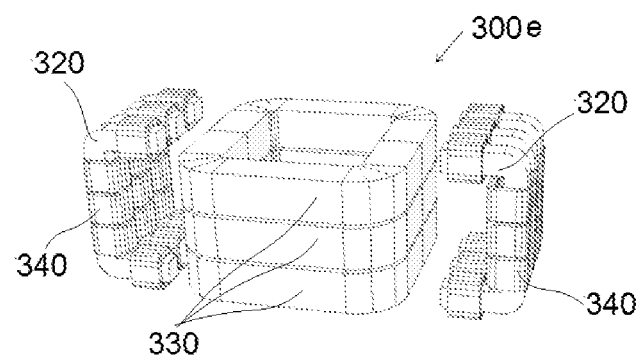

FIG. 5E displays embodiment 300*e* of the hybrid superconductive device characterized by a core-free SMES component. Such embodiment fits a scenario where the DC magnetic flux generated by the SMES coil segments 330 is much higher than the core saturation field is required. Hence, the DC core becomes redundant. Economic considerations such as the cost of the core may also result in avoiding the DC core component. In such scenario, the DC field generated by the SMES coil segments 330 is sufficient to saturate the AC core segments 320. The saturation level in the AC cores 320 would be determined by its proximity to the field source namely, the SMES coil 330. SMES coil comprises at least one coil segment 330, FCL includes at least one phase with two core limbs 320 per phase. AC winding comprises of at least one coil segment 340.

Figure 6:
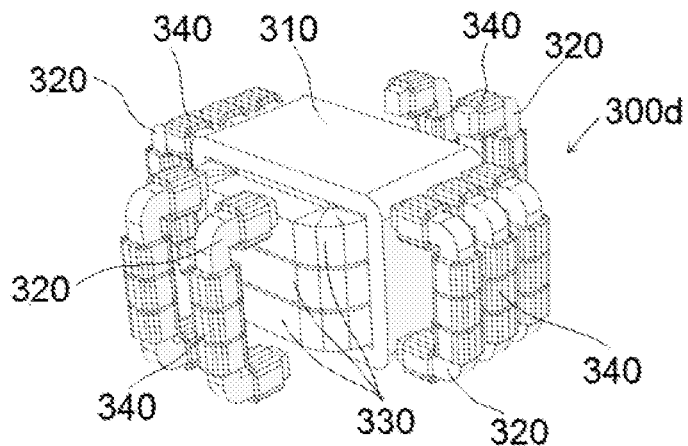
FIG. 6 is a perspective view of an alternative embodiment of a hybrid superconductive magnetic device with a shell-shaped magnetic core arrangement

Reference is now made to FIG. 6 displaying further embodiment where two additional AC phases are added to the device. Such phases may be added to the device with or without additional DC core segments facing such phase-cores. It allows controlling the saturation level separately for different phases.

Figure 7:
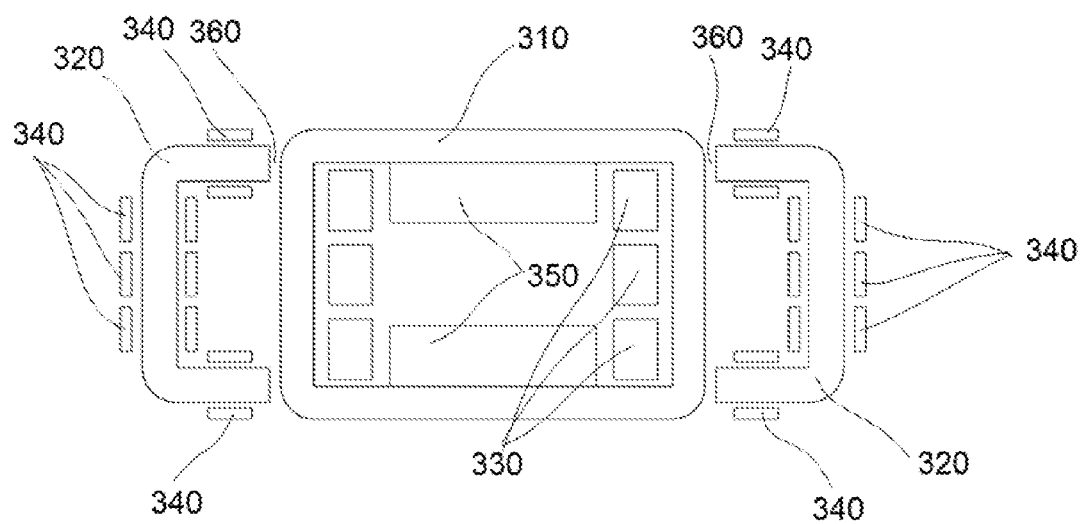
FIG. 7 is a cross-sectional view of an alternative embodiment of a hybrid superconductive magnetic device with a shell-shaped magnetic core arrangement.

Reference is now made to FIG. 7 presenting an exemplary cross-sectional view of the hybrid magnetic device. Shell-shaped magnetic core 310 is optionally coupled with side magnetic core limbs 320 via air gap 360. Magnetic core 310 is provided with inward protruding members 350 which leave an internal gap therebetween. The superconductive coil is formed by segments 330. AC windings split into several segments 340 sitting on core limbs 320. It should be noted that main core 310 is closed around the DC superconducting coil segments 330. The shell-like core design around the superconducting coil 330 is directed to reducing the field through the FCL cores 320 and controlling their saturation level. Air gaps 360 are added for preventing FCL cores 320 from oversaturation and facilitating their desaturation by fault current across segments 340. Also, air gaps between the main core 310 and the FCL cores 320 isolate the AC and DC circuits and make a physical separation between the high-voltage and the low-voltage sections of the device. Each AC winding per half-phase is split to five segments 340 for reducing the nominal insertion impedance of the device. Splitting the AC winding and spacing segments 340 apart from each other provides decrease in impedance of the total coil during nominal AC circuit operation.

Figures 8A, 8B:
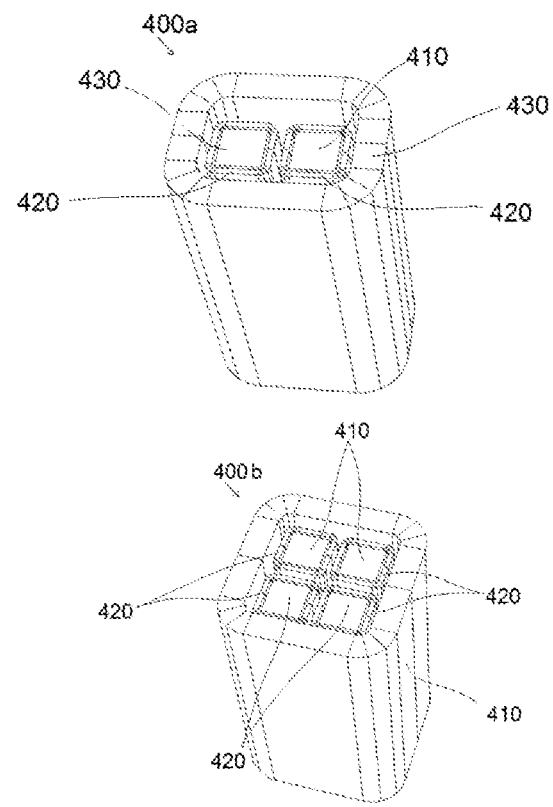
FIGS. 8A to 8C are perspective views of alternative embodiments of a hybrid superconductive magnetic device with an open quadrangular magnetic core arrangement.
Figure 8C:
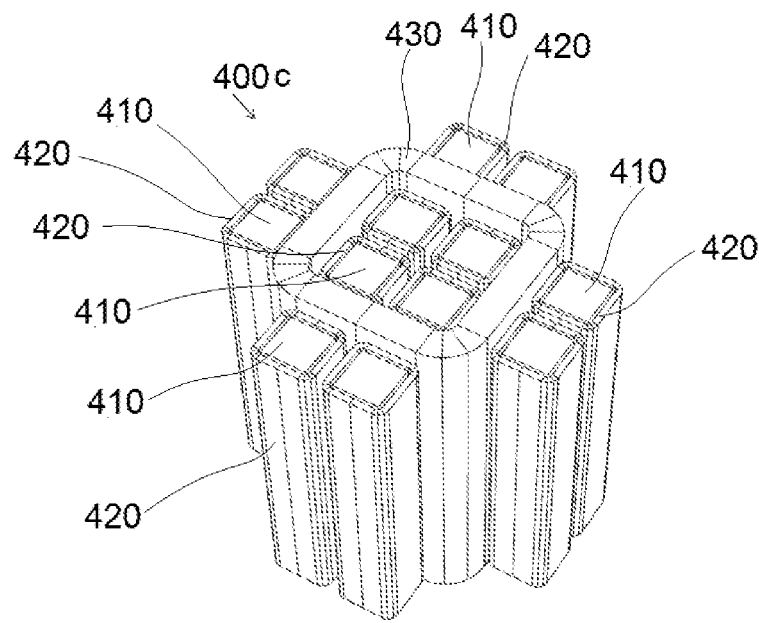

Reference is now made to FIGS. 8A to 8C presenting alternative embodiments 400a to 400c, respectively. Numeral 430 refers to a DC superconductive coil. AC windings 420 are carried by core limbs 410. AC windings 420 can be mounted within DC superconductive coil 430 (FIGS. 8A and 8B) and from the outside (FIG. 8C). FIG. 8a depicts embodiment 400a function as a SMES with single-phase FCL. The SMES coil 430 has no core and encloses two core limbs 410 each is wound with AC windings 420 mounted in a way that the AC flux generated by AC windings 420 opposes each other.

FIG. 8B depicts embodiment 400b providing an additional AC phase. Two AC winding 420 carried by cores 410 are added to an interior space of the SMES coil 430.

FIG. 8C depicts embodiment 400c functioning as a multiple-AC-phase device. In exemplary embodiment 400c, AC windings are partially mounted within SMES coil 430 and others on the exterior. The direction of DC flux is opposite in the interior and exterior space of the SMES coil 430. AC windings 420 are designed accordingly in a way that for each phase, one core supports the DC flux direction while another opposes it. In this way, the full cycle of the AC fault current is limited.

Figure 9:
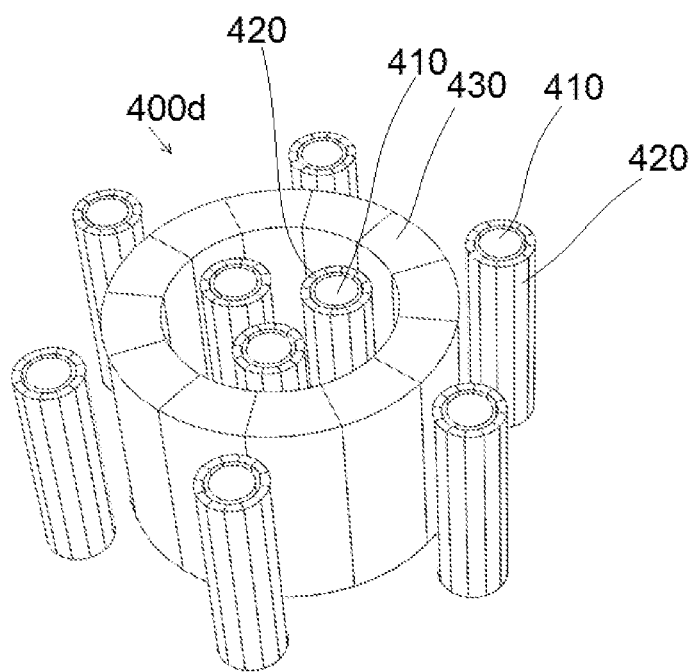
FIG. 9 is a perspective view of an alternative embodiment of a hybrid superconductive magnetic device with an open round magnetic core arrangement.

FIG. 9 shows embodiment 400d where the cross-sections of the SMES coil 430 and AC cores 410 and AC windings 420 are circular. Clearly, such cross-sections may be square, rectangular, race-track, or any other cross-section which is in use traditionally in coil winding practice.

Figure 10A:
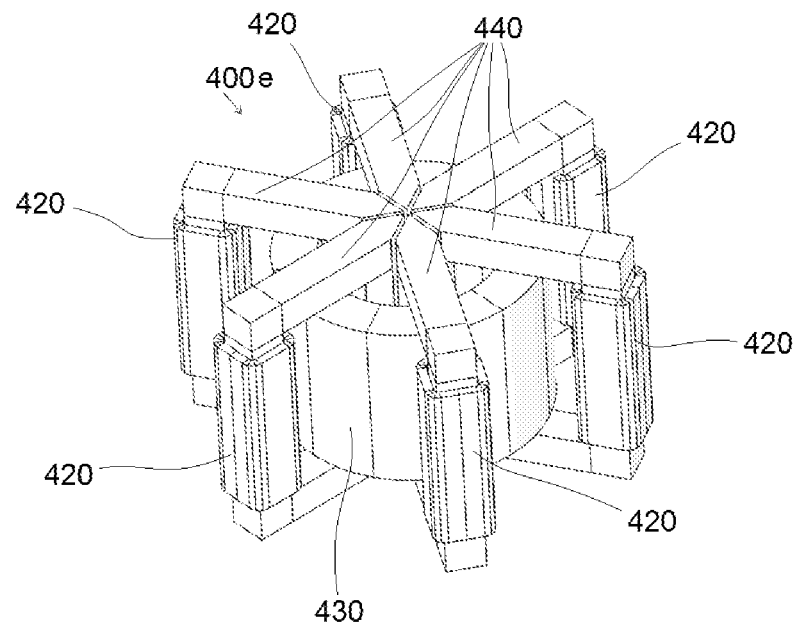
FIGS. 10A and 10B are a perspective view of an alternative embodiment of a hybrid superconductive magnetic device with a star-shaped magnetic core arrangement and a cross-sectional view thereof.
Figure 10B:
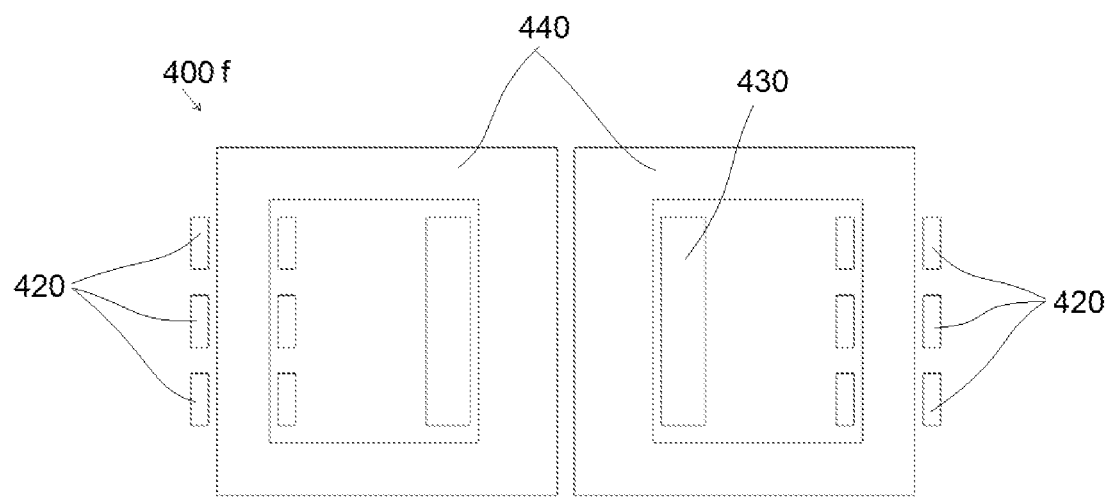

Reference is now made to FIGS. 10A and 10B presenting another exemplary embodiment 400e of a three-phase FCL and SMES hybrid device. The centrally located SMES coil 430 generates magnetic field for the SMES operation and for saturating the peripheral star-shaped AC core limbs 440. DC coil 430 and AC winding 420 may be split. AC cores limbs 440 may include a gap (not shown). Number of AC cores varies. At least two are needed for handling one-phase. Multiple phases are optional. According to the present exemplary embodiment, SMES coil 430 is made in block while the AC coil windings 420 are split into a few segments. Air gaps may be added to control the level of saturation in the AC core limbs 440 (not shown).

Figure 11A:
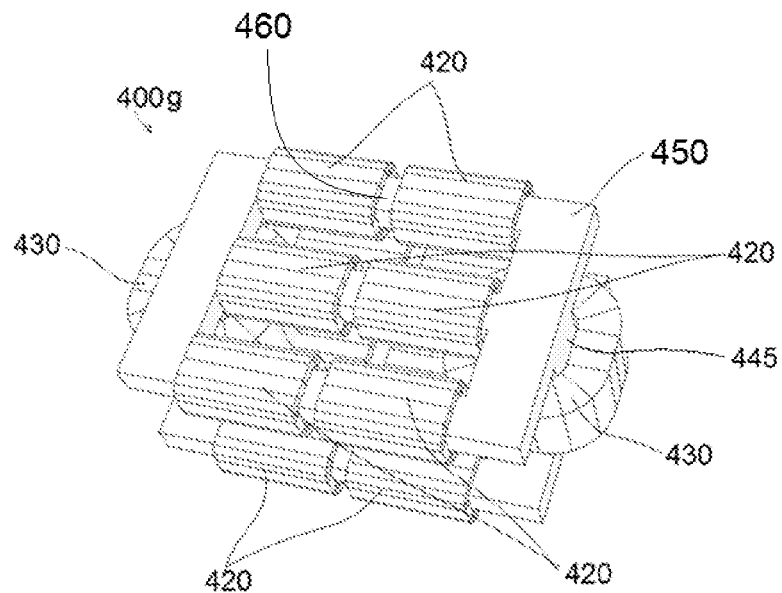
FIGS. 11A and 11B are perspective views of alternative embodiments of a hybrid superconductive magnetic device with a combined magnetic core arrangement.
Figure 11B:
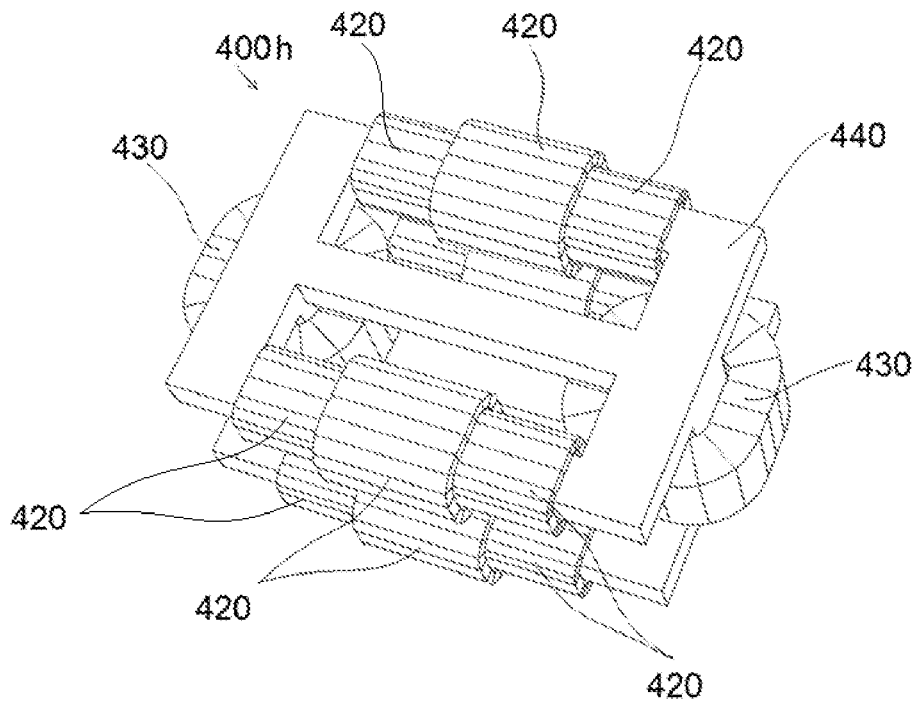

Reference is now made to FIGS. 11A and 11B showing another embodiment where SMES coils 430 are mounted on vertical limbs 445 interconnecting horizontal planes 450 formed by AC cores 460. Each AC core 460 carries at least one AC coil segment 420 and handles half-cycle of the AC fault cycle. According to exemplary embodiment 400g (FIG. 11A), in a 3-phase hybrid device, each phase is split between two parallel core planes 450.

FIG. 11B shows embodiment 400h similar to the previous and having 3 phase coils mounted on the same core 460. In such embodiment, care must be taken to ensure enough coil asymmetry to be able to de-saturate the core in the event of a symmetrical 3-phase fault event. At the same time, asymmetry has to remain minimal for maintaining negative sequence in the grid within allowed limits. The design in FIG. 11B shows an example for a SMES and two 3-phase FCL hybrid device.

The invention claimed is:

1. A hybrid superconductive device for stabilizing an electric grid, comprising:
   a. a magnetic core arrangement at least partially carrying AC windings;
   said AC windings connectable to an AC circuit for a current to be limited in the event of a fault;
   b. at least one superconductive coil configured for storing electromagnetic energy; said at least one superconductive coil magnetically coupled with said core arrangement and at least partially saturating said magnetic core arrangement during use;
   wherein said hybrid superconductive device further comprises a switch unit which switches electric current patterns corresponding to the following modes: at least partially charging said superconductive coil; a standby mode when said superconductive coil is looped back; and at least partially discharging said superconductive coil into said circuit;
   wherein said magnetic core arrangement comprises at least two plate-shaped core members; said superconductive coil is disposed between said two plate-shaped core members; core members carrying AC windings interconnect said two plate-shaped core members and circumferentially distributed thereover.

2. The device according to claim 1, wherein said switch unit comprises a pulse-width-modulation module for charging and discharging said superconductive coil.

3. The device according to claim 1, comprising a charging unit configured for charging said superconductive coil.

4. The device according to claim 1, comprising at least one passage located within said magnetic flux; said passage is configured for conducting a material flow comprising components magnetically separable by said magnetic flux.

5. The device according to claim 1, wherein said magnetic core arrangement comprises at least one winding magnetic core limb carrying said at least one winding; said at least one winding magnetic core limb is mounted such that said at least one superconductive coil, when energized, magnetically saturates, at least partially, said at least one core limb magnetic limb.

6. The device according to claim 1 comprising an overvoltage protection unit configured for monitoring voltage and temperature distribution across the superconducting coil and preventing thermal runaway in said coil from damage thereof.

* * * * *